United States Patent Office.

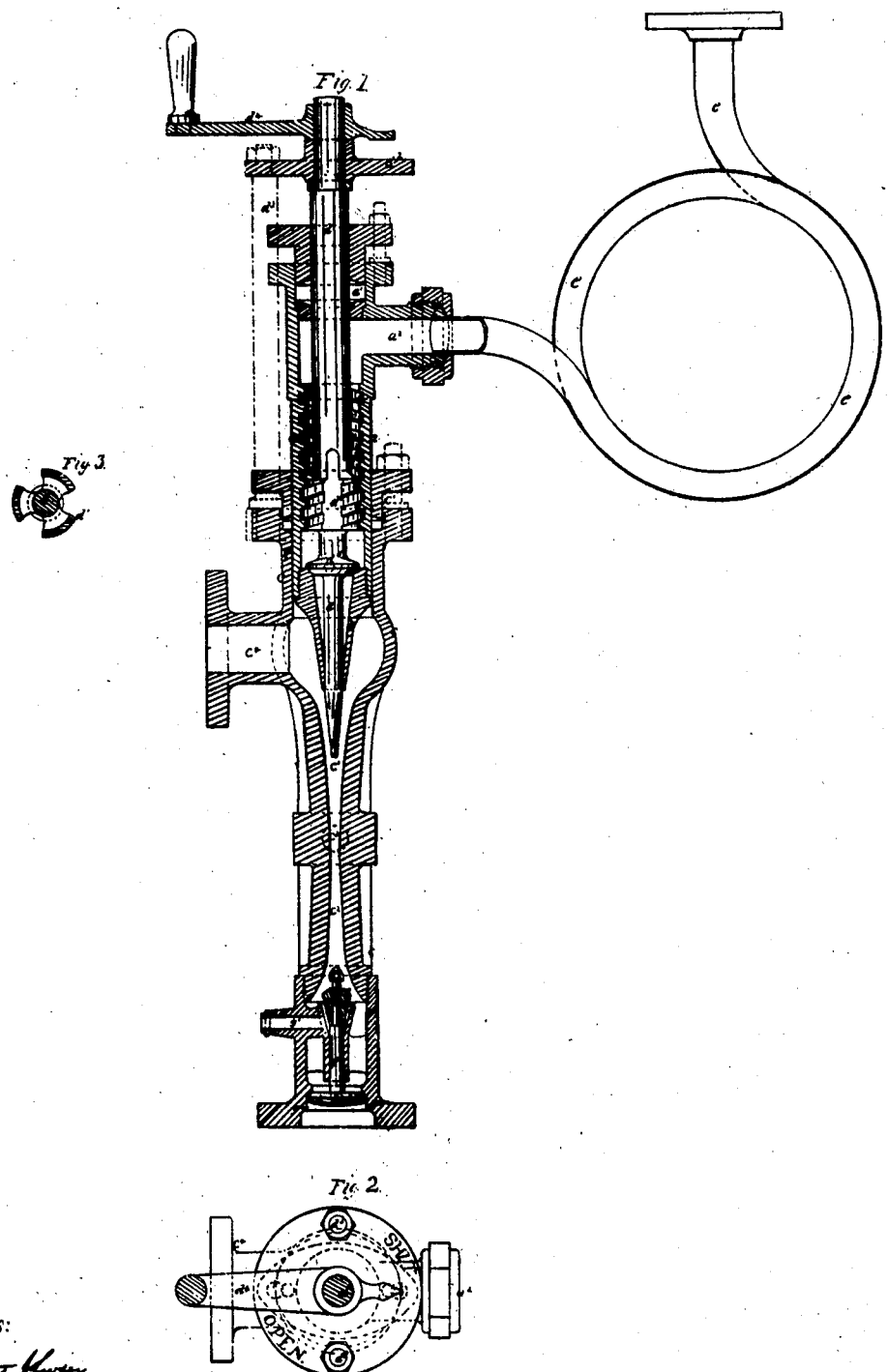

JAMES GRESHAM, OF MANCHESTER, GREAT BRITAIN, ASSIGNOR TO IRA DIMOCK, OF FLORENCE, MASSACHUSETTS.

Letters Patent No. 74,345, dated February 11, 1868; patented in England, April 13, 1866.

---

IMPROVEMENT IN INJECTORS FOR BOILERS.

---

The Schedule referred to in these Letters Patent and making part of the same.

---

TO ALL WHOM IT MAY CONCERN:

Be it known that I, JAMES GRESHAM, of the city of Manchester, in the county of Lancaster, in the United Kingdom of Great Britain and Ireland, have invented a new and useful Improvement in or applicable to that Apparatus for Raising and Forcing Fluids and Feeding Steam-Boilers known as "Giffard's Injector;" and I do hereby declare the following to be a full, clear, and exact description of the same, reference being had to the accompanying sheet of drawings, which form a part of this specification, and to the letters of reference marked thereon.

The improvements to be hereinafter specified, though wholly or partially applicable to various classes of injectors, can all be combined together in one injector; and an injector combining such improvements is shown by figs. 1, 2, and 3 of the accompanying drawings.

Figure 1 is a longitudinal section,

Figure 2 an end view, and

Figure 3 a detached sectional view through the screw part of the central spindle, showing the spaces cut away for steam to pass.

The first part of my invention consists in a combination of parts where the steam-nozzle is secured in the end of a pipe or ram, into which the steam is conveyed directly, and which pipe or ram has a screw-cone spindle in it, which is made to actuate the ram or pipe, to adjust the position of the steam-nozzle, so as to open the steam-space, and to regulate the water-space, by which combination gland-packings between the steam and water (which frequently leak, and render the injector useless) are dispensed with.

This part of my invention will be more easily understood by reference to the drawings.

$a$ is the ram, in the end of which the steam-nozzle $b$ is screwed. This ram, $a$, slides in and out of the other part, $c$, of the injector through a gland-packing, $c^1$, which prevents the air from entering, and the water from escaping. $d$ is a cone-spindle in the centre of the ram $a$, which has a screw-boss, $d^1$, on it, that screws into a thread in the bore of the ram $a$, as shown. The screw-boss $d^1$ upon the cone-spindle has spaces cut away, as shown by fig. 3, to allow the steam to pass from the upper part of the pipe or ram $a$ to the steam-nozzle $b$. The cone-spindle $d$ passes through a stuffing-gland, $a^1$, at the end of the ram or pipe $a$, as shown; and the cone-spindle has a bearing in a plate, $d^2$, which is connected with the lower part, $c$, of the injector by two rods, $d^3$, one of which is shown, in peculiar dotted line, out of position, in fig. 1, there being one upon each side, as shown in fig. 2. Thus arranged, the spindle can rotate, but cannot move endways; and, consequently, when rotated by a handle, $d^4$, the ram $a$ will be moved in and out, and, when moved inwards, the annular space for water will be reduced, and that for steam will be increased, and *vice versa* when the ram is moved outwards. The combinations above described may be used with the ordinary form of cone, or with a cone-spindle and a valve, which forms a separate part of the invention, to be hereinafter described. The steam is made to enter the ram $a$ through a branch, $a^2$, in its side, and may be conveyed to it by a pipe socketed in a stuffing-box to move inwards and outwards in a line parallel to the movement of the ram $a$; or a swivel-jointed pipe may be used to convey steam to the ram; but to neither of these arrangements do I make any claim.

The second part of my invention is applicable to injectors where the ram or steam-nozzle moves in the lengthway of the central spindle, as in fig. 1, or where the steam-nozzle is fixed, and the central spindle moved endways; and it consists in arranging a valve, $d^5$, upon the spindle $d$, and a valve-facing or seating upon the interior of the steam-nozzle $b$, as shown. By this construction or provision, the steam can be regulated and shut off perfectly by means of one handle, and thus a separate cock or valve is dispensed with. When the ordinary stop-valve is employed, an overflow or orifice should be established at the junction of the two cones $c^1 c^2$, as represented by dotted lines; but this forms no part of the invention, a similarly or equivalently-disposed overflow being common to other injectors. $c^4$ is the branch in the part $c$, through which water is brought to the injector.

The third part of my invention is used where the ordinary overflow-orifice just referred to is dispensed with, and consists in a method of opening and closing the outlet through which the fluid can pass when starting the injector, this orifice being closed when the injector has got to work, and thus prevents the admission of air; and this part of my invention is particularly useful when applied to self-adjusting injectors. This portion of the invention consists in a modification of the ordinary stop-valve of injectors, so that, when shut against its seating, it will have to move some distance from its seating when opening before there is sufficient space for the fluid to pass. This is done by making it act like a piston in a cylinder, the length of the cylindrical part being varied according to the length of movement required. The stem, $f^1$, of this valve, $f$, has another small valve, $g$, upon it, arranged to move upon the stem $f^1$ with play, so that the small valve $g$ will not shut until the stop-valve $f$ begins to open, and so that the small valve $g$ will not begin to open before the stop-valve $f$ enters the cylindrical portion of its seat. The fluid passing through the small valve $g$ can escape through the pipe $g'$. When the injector is to be started, the steam and fluid will first escape through the small valve $g$, but, when the injector-pressure becomes sufficient to overcome the boiler-pressure, the stop-valve $f$ is moved, and, when it is clear of the cylindrical part, the fluid can pass, and it is fully opened, by which time the small valve $g$ is shut, and the escape of fluid through the pipe $g'$ is prevented, the injector being then fully at work. This piston-action of the stop-valve $f$ is the main feature of this part of my invention, by which the necessary power is obtained for giving movement to the small valve with which it is connected. The valve $f$ need not be a perfectly water-tight fit in the cylindrical part.

What I claim as my invention, and desire to secure by Letters Patent, is—

1. The combination of the steam-ram $a$, carrying the steam-nozzle $b$, with a central spindle, $d$, whereby the steam and water can be adjusted by turning the one handle $d^4$, substantially as shown and described.

2. The arrangement of the valve $d^5$ on the stem $d$, in combination with the seat within the steam-ram $a$, substantially as described.

3. The valve $f$, moving in a cylinder, $f^2$, for a portion of its travel, in combination with the valve $g$ and spindle $f^1$, arranged and operating substantially as set forth.

In testimony whereof, I have signed my name to this specification in the presence of two subscribing witnesses.

JAMES GRESHAM.

Witnesses:
 PETER J. LINSEY,
 WM. GIFFARD.